United States Patent [19]

Kurimoto et al.

[11] 3,731,566

[45] May 8, 1973

[54] REST APPARATUS FOR PREVENTING BENDING OF A WORKPIECE

[75] Inventors: Miksihi Kurimoto, Nagoya; Kenji Nomura; Hiromichi Onouchi, both of Aichi, all of Japan

[73] Assignee: Toyoda Koki Kabushiki Kaisha, Kariya-shi, Aichi-ken, Japan

[22] Filed: Dec. 22, 1971

[21] Appl. No.: 210,732

[30] Foreign Application Priority Data

Dec. 22, 1970 Japan ..............................45/124239

[52] U.S. Cl. ...............................82/38 R, 51/238 S
[51] Int. Cl. ..............................................B23b 25/00
[58] Field of Search ....................82/38, 39; 51/238 S

[56] References Cited

UNITED STATES PATENTS 3,490,319   1/1970   Feld .........................................82/38

3,561,909   2/1971   Flohr.........................................82/38

FOREIGN PATENTS OR APPLICATIONS 157,872   1/1964   U.S.S.R. ................................82/38

*Primary Examiner*—Leonidas Vlachos
*Attorney*—Norman F. Oblon et al.

[57] ABSTRACT

A rest apparatus for supporting a workpiece of any diameter to prevent bending thereof during a machining operation features a rest shaft engageable with the workpiece and a piston for moving the rest shaft being telescopically arranged therewith. The position of the piston is controlled by a servo-valve actuated by a solenoid-operated stylus which may engage the workpiece. When a preselected relationship between the stylus and the servo-valve is properly established, the rest shaft is tightly clamped while engaging the workpiece so that the workpiece may be positively supported thereby.

6 Claims, 6 Drawing Figures

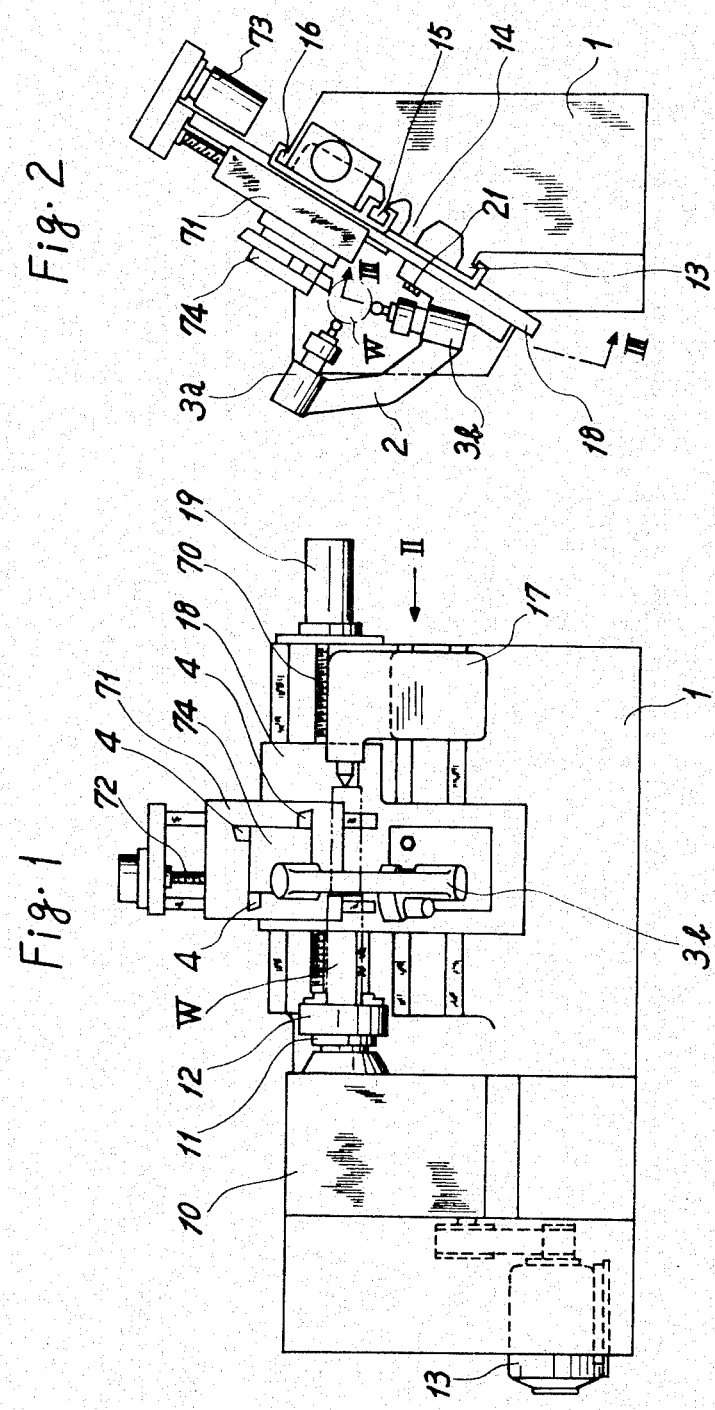

REST APPARATUS FOR PREVENTING BENDING OF A WORKPIECE

BACKGROUND OF THE INVENTION

1. Field Of The Invention:

The present invention relates generally to machining devices and more particularly to a rest apparatus for preventing bending of a workpiece due to the force created by a machining operation being performed thereon.

2. Description Of The Prior Art:

Conventionally, a rest shoe or shaft is moved by an actuator which is controlled by a servo-valve in turn being controlled by a stylus engaging the periphery of a workpiece. However, the devices heretofore employed do not permit relative displacement between the piston of the actuator and the rest shoe.

Accordingly, since the stylus and the rest shoe alike are worn by the frictional engagement with the workpiece, the established or proper positional relationship between the rest shoe and the workpiece is destroyed, so that the rest shoe is not maintained in its proper workpiece-supporting position, thereby resulting in the workpiece being bent by the force created by the machining operation on the workpiece. In order to eliminate such wear induced-affection of the stylus and the rest shoe, it is necessary with the devices heretofore available to manually adjust the positional relationship between the stylus and the rest device as machining progresses.

SUMMARY OF THE INVENTION

Accordingly, it is an object of the present invention to provide an improved rest apparatus capable of automatically following the change in diameter of a workpiece.

Another object of the present invention is to provide a rest apparatus in which the wear of a stylus is effectively compensated.

Still another object of the invention is to provide a rest apparatus in which a rest shaft may be clamped after the relationship between a stylus, a piston and the rest shaft is properly established.

Still another object of the invention is to provide a rest apparatus in which a stylus may be disengaged from a workpiece after the relationship between the stylus and a servo-valve for a rest shaft-controlling piston is properly established.

Briefly, the foregoing and other objects are attained according to the present invention through the provision of a rest shaft engageable with the periphery of a workpiece and a rest shaft-moving piston controlled by a servo-valve being telescopically fabricated therewith. A pivotable stylus engageable with the workpiece detects the diameter of the workpiece and also engages the top of a spool valve of the servo-valve for controlling the same. When the spool valve of the servo-valve is brought into a predetermined position by the stylus wherein the proper relationship between the stylus, the piston and the rest shaft is established, the rest shaft is clamped so that the workpiece may be positively supported thereby.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views, and wherein:

FIG. 1 is a front view showing a general arrangement of one embodiment of the present invention;

FIG. 2 is a right side view leaving out a tail stock, taken along the arrow II of FIG. 1;

DESCRIPTION OF THE ILLUSTRATED EMBODIMENTS

Figure 4:
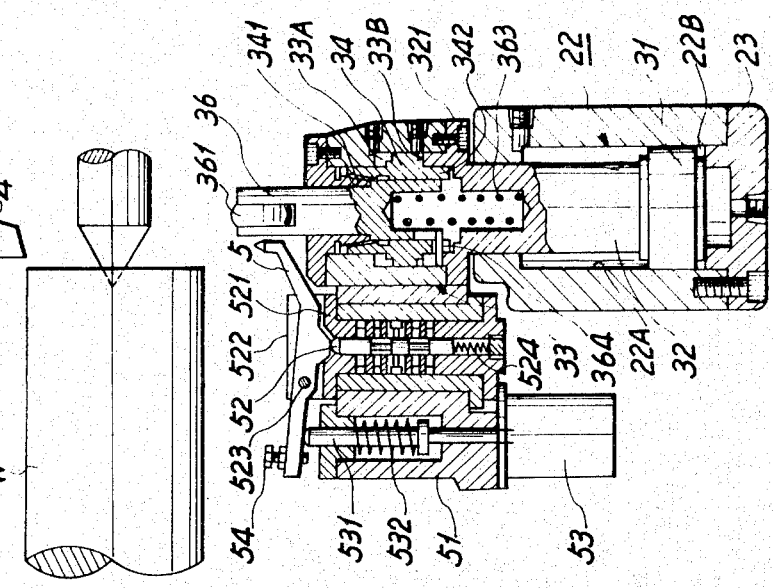
FIG. 4 is a sectional view taken along the line III—III in FIG. 2 and showing the rest apparatus in a non-operational situation.

Referring now to the drawings, and particularly to FIGS 1 and 2 thereof, a bed 1 fixedly supports a headstock 10 on which a main spindle 11 is rotatably mounted for being rotated by a motor 13. A chuck 12 for clamping a workpiece W is fixedly held at one end of the main spindle 11. A plurality of vertically spaced guideways 13, 14, 15 and 16 are formed on a slant surface of the bed 1 being in parallel relation with the axis of the main spindle 11. The workpiece W is supported between the chuck 12 and a tailstock 17, which is fixedly held on the guideways 13 and 14. Slidably mounted on the guideways 13, 15 and 16 is a saddle 18 being longitudinally movable thereon by a pulse motor 19 mounted on the bed 1 to rotate a feed screw 70 threadedly engaging the saddle. A cross slide 71 is slidably mounted on the saddle 18 being transversely movable thereon by another pulse motor 73 mounted on the saddle 18 to rotate a feed screw 72 threadedly engaging the cross-slide. A turret head 74 carrying a plurality of tools 4 is indexably mounted on the cross slide 71, being selectively rotatable by a suitable driving means, not shown.

Support, or rest, devices 3a and 3b are mounted on a housing 2 being spaced apart in a circular plane more than 90° for supporting the workpiece W against forces created by the tools 4 during machining to prevent bending of the workpiece. Prior to performing a machining operation with one of the tools 4, the housing 2 may be adjusted longitudinally on the saddle 18 to which it is secured by a T-bolt 21 by manipulating the T-bolt in a slot, not shown, provided in the saddle.

Figure 3:
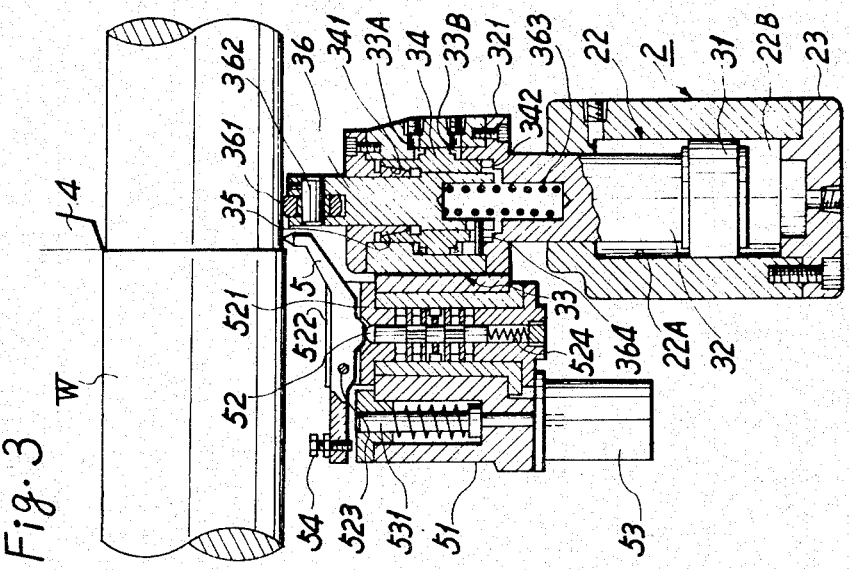
FIG. 3 is a sectional view of a rest apparatus in enlarged scale, taken along the line III—III in FIG. 2.

The rest device 3b, shown in FIGS. 3 and 4, which sustains a relatively smaller force than that of the rest device 3a, is accompanied by a servo-valve for controlling the same. As shown, a rest actuator 22 in the housing 2 features a piston 31 having an integral piston rod 32 being slidably disposed in the actuator 22 but being retained from rotational movement therein by a retention member, not shown, which may be of a conventional design. A collet clamping actuator 33 mounted on a flange portion 321 on the free end of the piston rod 32 has a piston 34 slidably mounted therein and a collet 35 having a conical portion secured on one side thereof. A rest shaft 36 extends through the piston 34 and the collet 35. The piston 34 is provided with a clamping portion 341 having a conical cavity complementary to the conical portion of the collet 35 so that when the piston 34 is moved toward the workpiece W, the rest shaft 36 may be clamped through the collet 35. When the collet 35 and the clamping portion 341 of the piston 34 are disengaged from each other, the rest shaft 36 is urged toward the workpiece W by a coil spring 363 interposed between the piston rod 32 and the rest shaft 36. A roller 361, which may be engaged with the workpiece W, is rotatably mounted on the rest shaft 36 at one end thereof by a pin 362. A pin 364 radially press fitted to the piston rod 32 is effective to prevent the rest shaft 36 and the piston 34 from rotationally moving relative thereto while permitting the same to move axially thereof.

It is to be appreciated that the construction of the rest device 3a is exactly identical to that of the rest device 3b, and thus a detailed description thereof is omitted for the sake of simplicity.

Referring still to both FIGS. 3 and 4, the details of the servo-valve which is provided only on the rest device 3b will now be described. A housing 51 is fixedly secured to the housing of the collet clamping actuator 33. A stylus 5 is pivotably mounted by a pin 523 on a projected portion 522 of a valve-sleeve 521 in a groove made therein and a stop 54 is threadedly engaged with the stylus 5 at the left end thereof to regulate any counterclockwise rotation thereof by engaging the housing 51. A spool valve 52 is slidably disposed in the valve-sleeve 521 secured to the housing 51 being biased upwardly therein by a coil spring 524 for urging the stylus 5 to rotate in a counterclockwise direction.

A pushing rod 531 disposed in the housing 51 is continuously being urged downwardly by a coil spring 532. The pushing rod 531 may be moved upward against the force of spring 532 by means of a solenoid 53 secured to the housing 51, so that the stylus 5 may be turned in a clockwise direction to push the spool valve 52 into the down position thereof, whereupon the housing 51 the collet clamping actuator 33 to which it is secured may be moved downwardly for in turn retracting the piston 31.

Figures 5, 6:
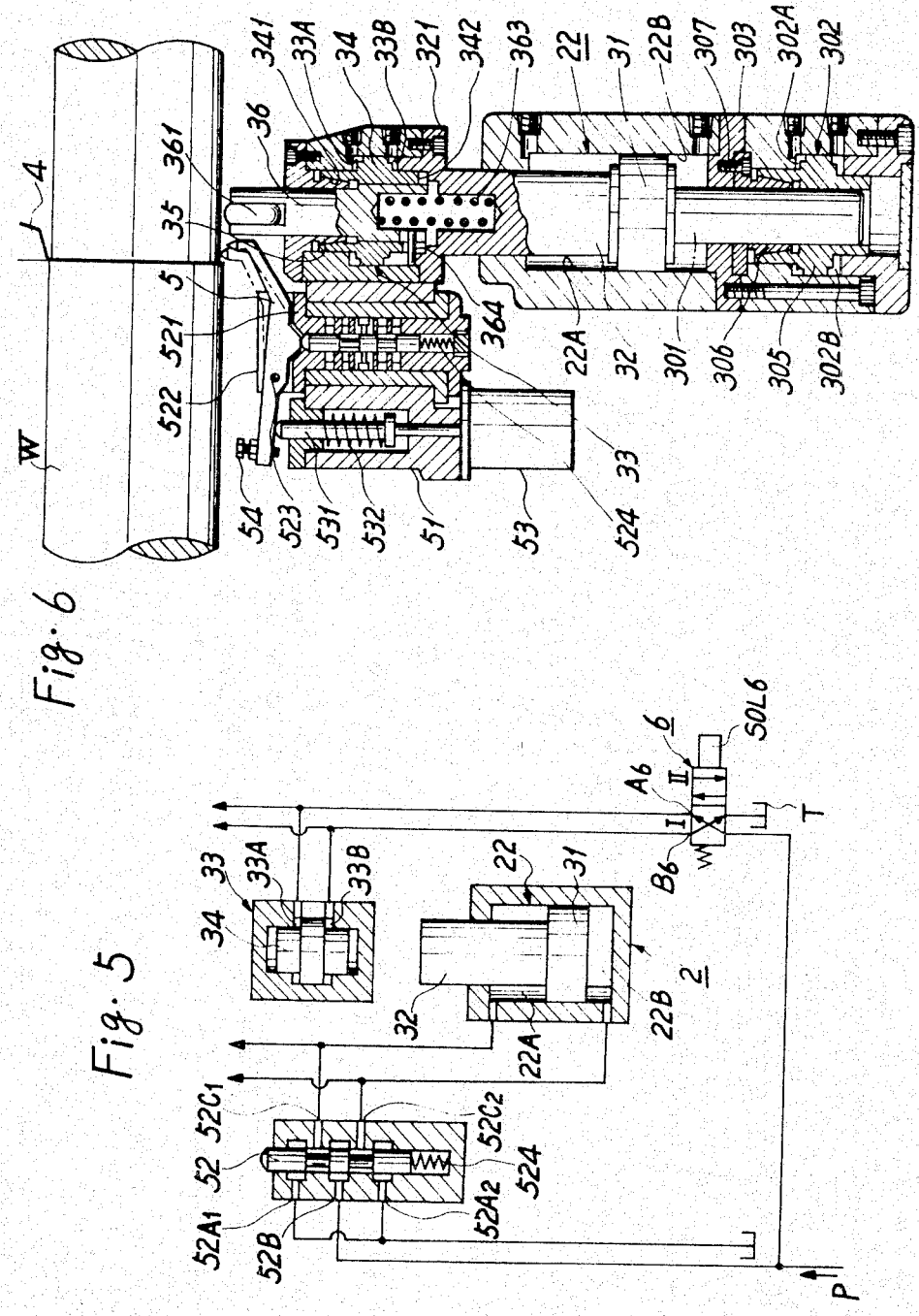
FIG. 5 is a hydraulic circuit for controlling the rest apparatus.
FIG. 6 illustrates another embodiment formed in accordance with the present invention.

Turning now to FIG. 5, showing a hydraulic control circuit, ports A6 and B6 of a change-over valve 6 for controlling the collet clamping actuators 33 of the rest devices 3a and 3b are respectively connected to upper chambers 33a and lower chambers 33b thereof, the change-over valve 6 being provided with an operating solenoid SOL6 and supplied with pressurized fluid from a source P and designed to drain the fluid into a reservoir T.

It is to be appreciated that the description on the operation of the hydraulic circuit for the rest device 3a will be preferably omitted, since the rest device 3a has the same construction as the rest device 3b and is controlled simultaneously with the rest device 3b, as for example, when the piston 31 for the rest device 3b is moved upward, the piston 31 for the rest device 3a id simultaneously moved upward.

Spool ports 52C1 and 52C2 are respectively connected to the upper and lower chambers 22A and 22B of the rest actuator 22. When the spool valve 52 is moved into an upper position from that illustrated in FIG. 5, spool ports 52B and 52A1 are respectively connected with the spool ports 52C2 and 52C1 and when the spool valve 52 is moved into a lower position than that illustrated, spool ports 52B and 52A2 are respectively connected with the spool ports 52C1 and 52C2, whereby the pressurized fluid may be selectively supplied to the upper chamber 22A or the lower chamber 22B of the rest actuator 22.

In operation, a workpiece W may be machined by a tool 4 when the saddle 18 is moved from the position shown in FIG. 4 in an axial direction of the workpiece. When the saddle 18 has been moved by a predetermined distance or a machining operation of a predetermined amount has been performed, the solenoid 53 is de-energized by a signal from an electric limit switch, not shown, so that the pushing rod 531 is moved down by the coil spring 532, whereby the pushing rod 531 is disengaged from the stylus 5. Subsequently, the stylus 5 is turned in a counterclockwise direction by spool valve 52 being biased upwardly by the coil spring 524. Upon such upward movement of the spool valve 52, fluid under pressure is introduced into the lower chamber 22B of the rest adjusting actuator 22 through the spool ports 52B and 52C2, and the fluid in the upper chamber 22A thereof is evacuated through the spool ports 52C1 and 52A1 to the reservoir. Therefore, the rest shaft 36 and the stylus 5 of each rest device are moved toward the workpiece W by the action of the respective pistons 31, thereafter becoming engaged therewith, whereby the pistons 31 are moved with respect to the rest shafts 36 of the rest devices 3a and 3b against the force of the coil springs 363. When the stylus 5 engages the workpiece W, it is turned in a clockwise direction so that the spool valve 52 is moved down into a neutral position, the position shown in FIGS. 3 and 5, whereby the supply of pressurized fluid into the lower chamber 22B of the adjusting actuator 22 is stopped since the spool port 52B connected to the source P becomes closed by a land portion of the spool valve 52.

Subsequently, upon de-energization of a timer coil, not shown, which is energized when the solenoid 53 is de-energized, the solenoid SOL6 of the change-over valve 6 is energized to cause a spool valve of the change-over 6 to be shifted from position I to position II so that the pressurized fluid may now be supplied to the lower chamber 33B to the collet clamping actuator 33 through the port B6 and the fluid in the upper chamber 33A thereof evacuated through the port A6 to the reservoir T. Consequently, the clamping portion of the piston 34 is engaged with the collet 35 to tightly clamp the rest shsft 36.

At this stage, mutual movement between each rest shaft 36 and its respective piston 34 is now precluded, whereby the workpiece W is positively supported so that bending thereof may be prevented.

When the saddle 18 has been moved in an axial direction of the workpiece W through such a distance that the machining operation on the workpiece is completed, the tool 4 is retracted and the solenoid 53 is energized so that the pushing rod 531 may turn the stylus 5 in a clockwise direction to thereby disengage the same from the workpiece and cause it to push down the spool valve 52. When the spool valve 52 has been moved into its lower position, the pressurized fluid is introduced into the upper chamber 22A of the rest actuator 22 through the spool ports 52B and 52C1 and the fluid in the lower chamber 22B is evacuated through the spool ports 52C2 and 52A2 to the reservoir. Thus, the pistons 31 of the rest actuators 22 are moved down together with the rest shafts 36, the styluses 5 and their associated devices. At this moment, the solenoid SOL6 is de-energized so that the spool valve in the change-over valve 6 is returned from the position II to position I, whereby the pressurized fluid is supplied to the upper chamber 33A of the collet clamping actuator 33 through the port A6 of the change-over valve 6, and the lower chamber 33B is connected to the reservoir T through the port B6 thereof. The piston 34 is thus moved downward to disengage the clamping portion 341 from the collet 35 and to release the rest shaft 36. When the tool 4 and the rest shaft 36 are retracted in the above-mentioned manner, the saddle 18 may be moved back to its original position. When a workpiece having different diameters along the axial direction thereof is required to be machined, the solenoid 53 is temporarily energized at the different diameter portions thereof in conjunction with the radial shifting of the tool 4 to retract the rest shaft 36 and the clamping portion 341 of the piston 34 is disengaged from the collet 35 in the same manner as before. When the tool 4 has been traversed in the axial direction of the workpiece and is ready to perform a machining operation along a predetermined distance, the solenoid 53 is de-energized and the piston 31 is advanced to cause the rest shaft 36 to engage the workpiece at the diameter different from before, and the collet 35 is clamped by the collet clamping actuator 33 for continuing the machining operation. In this manner, a workpiece having different diameters can also be supported by the rest shafts 36.

According to the embodiment just described, since the rest shafts 36 are clamped when the spool valve 52 is moved into the neutral position, the wear of the styluses may be compensated, or, in other words, the rest shafts 36 may always be engaged with the workpiece W with a required force thereagainst regardless of wear of the stylus 5.

Referring now to FIG. 6, details of another embodiment of the invention are described, the members thereof functioning the same as members being denoted by the same reference numerals in the previous embodiment, and the description of the rest device 3a also being omitted since the rest device 3a has the same construction as the rest device 3b. According to this other embodiment, the piston 31 is also clamped by another clamping actuator, and the stylus 5 is disengaged while the piston 31 is being clamped.

Extending from the lower end of piston 31 is a clamp shaft 301 which may be clamped with respect to the housing 2. A clamping actuator 302 is fixed to the rest actuator 22 and has a slidable piston 305 therein. A collet 306 for clamping the clamp shaft 301 is secured to an intermediate plate 303 fixed to the rest actuator 22 by screws 307 and is arranged to be clamped by a clamping portion of the piston 305.

An upper chamber 302A of the clamping actuator 302 is connected to the upper chamber 33A of the collet clamping actuator 33, and a lower chamber 302B thereof is connected to the lower chamber 33B of the collet clamping actuator 33. Accordingly, when the rest shaft 36 is clamped through the collet 35, the clamp shaft 301 is also clamped through the collet 306 to thereby fix the piston 31 in position. In this embodiment, after the piston 31 and the rest shaft 36 are clamped, the stylus 5 may be disengaged from the workpiece W. To effectuate the disengagement of the stylus 5 from the workpiece W, the solenoid 53 is energized so that the pushing rod 531 is pushed upward to turn the stylus 5 in a clockwise direction. Therefore, wear of the stylus 5 due to the frictional engagement with the workpiece W can be effectively avoided.

It is to be appreciated that the rest apparatus described herein can be used in a plunge cut operation. When the workpiece W is reduced in diameter by a machining operation, the stylus 5 is turned in a counterclockwise direction, and thus the pressurized fluid is supplied to the lower chamber 22B of the rest adjusting actuator 22 through the spool ports 52B and 52C2 and the fluid in the upper chamber 22A is evacuated through spool ports 52C1 and 52A1 to the reservoir so that the piston 31 is moved upward, or in other words, the rest shaft 36 is moved toward workpiece W to compensate for the diameter reduction thereof. When the piston 31 is moved upward, the stylus 5 carried thereby and being engaged with the workpiece is, in turn, turned in a clockwise direction to thereby make the spool valve 52 move back to the neutral position thereof to cause the circulation of the fluid to cease, whereby the rest shaft 36 is fixed at the compensated position.

Obviously many modifications and variations of the present invention are possible in light of the above teachings. It is to be understood, therefore, that within the scope of the appended claims, the present invention may be practiced otherwise than as specifically described herein. Accordingly,

What is claimed as new and desired to be secured by letters patent of the United States is:

1. Rest apparatus for preventing bending of a workpiece during machining comprising:
   at least one rest adjusting actuator having a slidable piston therein;
   a rest shaft slidably mounted on said piston of each of said at least one rest adjusting actuators;
   spring means disposed between said piston and said rest shaft of each of said at least one rest adjusting actuators to permit mutual movement therebetween and normally urging said rest shaft toward said workpiece;
   detecting means for detecting the diameter of said workpiece;
   servo-valve means responsive to said detecting means for supplying pressurized fluid to each of said at least one rest adjusting actuators; and
   clamping means in each of said at least one rest adjusting actuators for clamping said rest shaft with respect to said piston when said detecting means is brought into a predetermined position with respect to said servo-valve means by engaging said workpiece.

2. Rest apparatus according to claim 1, wherein said servo-valve means comprises:
a slidable spool valve means; and
biasing means for urging said spool valve in one direction;
said detecting means being pivotably mounted on said piston and adapted to urge said spool valve in another direction when engaged with a workpiece.

3. Rest apparatus according to claim 2, which further comprises;
means for disengaging said detecting means from a workpiece and for urging said spool valve in said another direction through said detecting means so that each of said at least one rest adjusting actuators retracts said piston thereof.

4. Rest apparatus according to claim 1, further comprising a second clamping means for clamping said piston of each of said at least one rest adjusting actuators being simultaneously operable with said first mentioned clamping means for clamping said rest shaft of each of said at least one rest adjusting actuators.

5. Rest apparatus according to claim 4, further comprising means for disengaging said detecting means from a workpiece.

6. Rest apparatus according to claim 1, wherein said at least one rest adjusting actuator is a plurality of rest adjusting actuators.

* * * * *